United States Patent [19]

Molerus et al.

[11] Patent Number: 4,931,260
[45] Date of Patent: Jun. 5, 1990

[54] PROCESS AND APPARATUS FOR THE TREATMENT OF GRANULAR SOLID MATERIALS IN A FLUIDIZED LAYER

[75] Inventors: Otto O. Molerus, Hemhofen; Karl-Ernst Wirth, Happurg, both of Fed. Rep. of Germany

[73] Assignee: Rheinische Braunkohlenwerke AG, Cologne, Fed. Rep. of Germany

[21] Appl. No.: 149,251

[22] Filed: Jan. 28, 1988

[30] Foreign Application Priority Data

Jan. 31, 1987 [DE] Fed. Rep. of Germany ....... 3702892

[51] Int. Cl.$^5$ ............................................. F27B 15/08
[52] U.S. Cl. .................... 422/147; 422/145; 431/7; 110/245; 34/57 R
[58] Field of Search ............... 422/141, 142, 144, 145, 422/147; 432/14, 15; 34/57 A, 57 B, 57 R; 431/7, 9, 170; 110/245, 263; 118/DIG. 5; 209/488, 500, 502

[56] References Cited

U.S. PATENT DOCUMENTS

| | | | |
|---|---|---|---|
| 2,671,721 | 3/1954 | Gilliland | 48/196 |
| 2,739,845 | 3/1956 | Berg | 302/29 |
| 2,873,145 | 2/1959 | Moser, Jr. | 302/53 |
| 3,537,755 | 11/1970 | Schmidt | 302/24 |
| 3,751,214 | 8/1973 | Wenzel et al. | 432/15 |
| 3,840,353 | 10/1974 | Squires | 48/203 |
| 3,871,711 | 3/1975 | Rusterholz | 302/26 |
| 3,874,739 | 4/1975 | Mitchell | 302/24 |
| 3,957,457 | 5/1976 | Squires | 48/73 |
| 4,017,272 | 4/1977 | Anwer et al. | 48/197 R |
| 4,076,796 | 2/1978 | Reh et al. | 422/145 |
| 4,185,942 | 1/1980 | Bazan | 406/85 |
| 4,311,670 | 1/1982 | Nieminen et al. | 34/57 A |
| 4,419,965 | 12/1983 | Garcia-Mallol et al. | 110/245 |
| 4,442,797 | 4/1984 | Strohmeyer, Jr. | 431/170 |
| 4,469,050 | 9/1984 | Korenberg | 110/245 |
| 4,579,070 | 4/1986 | Lin et al. | 110/245 |
| 4,704,084 | 11/1987 | Liu et al. | 431/7 |
| 4,709,663 | 12/1987 | Larson et al. | 110/245 |
| 4,781,574 | 11/1988 | Taylor | 110/263 |

FOREIGN PATENT DOCUMENTS

| | | |
|---|---|---|
| 92622 | 11/1983 | European Pat. Off. . |
| 161970 | 11/1985 | European Pat. Off. . |
| 173782 | 3/1986 | European Pat. Off. . |
| 1017314 | 10/1953 | Fed. Rep. of Germany . |
| 974634 | 3/1961 | Fed. Rep. of Germany . |
| 1174301 | 7/1964 | Fed. Rep. of Germany . |
| 2524540 | 12/1976 | Fed. Rep. of Germany . |
| 3124832 | 1/1983 | Fed. Rep. of Germany . |
| 86-3986 | 7/1986 | World Int. Prop. O. . |

Primary Examiner—Barry S. Richman
Assistant Examiner—Gregory R. Muir
Attorney, Agent, or Firm—Seidel, Gonda, Lavorgna & Monaco

[57] ABSTRACT

Solid material which is carried out of a fluidized bed reactor with the gas discharged therefrom and which is separated off in a separator is returned to the reactor by way of a recycling means. To reduce problems caused by virtue of differing pressure levels within the system in the recycling operation, the pressure in the recycling means between the separator and the upper boundary of a bed of solid material which is formed in the recycling means is reduced by suction removal of gas to a pressure level which is no higher than or even lower than the lowest pressure in the separator which in turn is lower than the pressure in the reactor.

4 Claims, 4 Drawing Sheets

PROCESS AND APPARATUS FOR THE TREATMENT OF GRANULAR SOLID MATERIALS IN A FLUIDIZED LAYER

The invention relates to a process and an apparatus for the treatment of granular solid materials in a fluidised layer.

Situations in which such a process and apparatus may be employed may involve physical and/or chemical conversion of solid materials, for example for the production of gas from carbonaceous solid materials, or the combustion of such solid materials. Gas is generated for example in a High Temperature Winkler gasifier in which a suitable solid material such as lignite or brown coal is converted using one or more gaseous gasification agents which have exothermic and endothermic effects. In a combustion process, fine-grain carbonaceous solid material such as brown coal or lignite undergoes combustion in a fluidised bed reactor, with a supply of air. The gaseous agent or agents normally serve at the same time as a fluidisation agent.

Such a process and apparatus may be used in particular in relation to highly expanded and/or circulating fluidised layers or beds, both at atmospheric pressure and also at elevated pressure. The boundaries between the individual fluidised layer states are fluid and a fluidised layer, including such a layer in a highly expanded state, normally has an upper boundary which, although of an irregular configuration and possibly varying in regard to its position in respect of height, is fairly pronounced with the density of distribution of the solid material markedly falling at the upper boundary of the actual fluidised layer. In the case of a circulating fluidised layer, such an upper boundary can no longer be perceived, the fluidised layer normally being a density which falls more or less continuously in an upward direction over the entire height of the fluidised bed reactor. Besides the grain distribution in the solid material and other influencing parameters, the state of a fluidised layer also depends in particular on the speed at which the gaseous agent or agents serving as the fluidisation medium flow upwardly through the fluidised bed reactor. With increasing speed, the state of the fluidised layer is displaced towards that of a circulating fluidised layer and, at an even higher speed, the material in the layer or bed goes into the state of a flying flow.

That applies irrespective of the pressure under which the process is operated, for example in a range of between 5 and 40 bars and preferably between 20 and 30 bars.

In operation of a fluidised layer or bed and indeed even in the case of such a layer which has a clearly defined upper boundary, a portion of the solid material in the bed is entrained by the gases which flow upwardly through the fluidised layer or bed and is initially discharged into the space within the reactor, above the fluidised layer, and from there is discharged with the gases from the reactor. Under conditions which in other respects remain the same, the proportion of solid particles which are entrained upwardly out of the fluidised layer increases with an increasing speed of flow of the gaseous agent until, in the case of a circulating fluidised layer, the major part of the unconverted solid material in the layer is discharged upwardly out of the reactor with the gaseous agent. In order to produce a sufficient conversion effect, the residence time of the solid material in the reactor is an important parameter and it is therefore generally necessary for the solid particles which are discharged with the gaseous agent to be returned to the reactor and the fluidised bed therein. That procedure is carried on, for example when subjecting carbonaceous particles to gasification or combustion, until the individual grain only or quite predominantly consists of ash. Those solid residues are generally discharged from the reactor at the bottom thereof.

Difficulties arise in regard to the recycling of the solid materials by virtue of the fact that the overall system which essentially comprises the actual fluidised layer reactor, a conduit through which the gaseous agent or agents with the solid particles entrained thereby are removed from the reactor, at least one separator which is generally in the form of a cyclone separator and the recycling means for returning entrained material to the reactor involves a pressure drop such that the pressure decreases within the reactor to an upward direction, that is to say in the direction in which the gases flow. A further pressure drop occurs within the separator, the pressure in the separator being even lower in the region at which the recycling means for the solid material which is separated off is connected thereto, than the pressure in the upper region of the reactor. On the other hand, at the end of the recycling means which is remote from the separator, where the recycling means communicates with the lower region of the reactor, the pressure obtaining in that region of the reactor is applied to the recycling means so that different pressures are effective at the two ends of the recycling means, the two regions at different pressures being more or less effectively shielded from each other by the solid material which accumulates in the recycling means and which is to be returned to the reactor. A consequence of that particularity of the arrangement is that the solid material moves downwardly in the recycling conduit under the effect of the force of gravity, whereas the gas seeks to flow upwardly in the conduit, by virtue of the pressure gradient. However opposite movements of that nature are subject to narrow limits. In practice, complex and undefinable operating conditions then occur within the recycling means, which have the result that the return flow to the reactor of the solid material which is separated off in the separator is prevented or at least adversely affected. That can finally result in blockage of the recycling means as the solid particles in the recycling means become clogged therein. Added to that is the fact that the above-indicated operating state gives rise to uncontrollable and non-influencible pressure equalisation phenomena which also result in operational difficulties and which can possibly even have an adverse effect on the separation capability of the separator.

The danger that the solid material in the recycling conduit may become clogged therein, with the result that after a short period of time solid material accumulating in the recycling conduit may 'back up' through the conduit until it reaches the separator, is to be attributed in particular to the fact that the recycling conduit is of a small diameter in comparison with its length. The length thereof will be generally determined by the distance to be covered between the separator and the region of the fluidised bed reactor into which the solid material to be recycled is to be introduced. An increase in the diameter of the recycling conduit which would counteract the risk of blockages occurring is generally out of the question as that would undesirably affect the pressure and flow conditions in the entire installation, more particularly possibly to such a point that the system would no longer be operational. An increase in the diameter of the recycling conduit which, as already mentioned, generally communicates with the reactor in the lower region thereof would have the result, with a given reactor diameter, that a larger proportion of the gaseous fluidisation agent, possibly accompanied by solid particles, would pass into the lower region of the recycling conduit so that the flow conditions which are intended to provide for a direction of flow upwardly in the reactor, from there into the connecting conduit to the separator and from there by way of the recycling conduit back into the lower region of the reactor, could possibly be reversed or at any event could be influenced in such a way as to exclude proper operation of the system. In other words, the recycling conduit of the recycling means, in consideration of the above-indicated factors, must be of a small diameter with a correspondingly high flow resistance in order to act as a kind of throttle or choke to prevent a pressure equalisation effect from occurring as between the lower part of the reactor and the separator, by virtue of a disadvantageously large amount of gas flowing upwardly in the conduit.

U.S. Pat. No. 3,840,353 discloses a process and an apparatus for the treatment of granular solid materials in a fluidised layer wherein there is provided a recycling means in which the solid material to be recycled accumulates in a bed which is fluidised by gas supplied from the outside. That arrangement also affords the option of disposing a special container in the recycling means, which is connected to the reactor by way of a siphon-like connecting conduit. The bed of solid material in that conduit is also fluidised by gas which is supplied from the outside. That process also involves the problems described in the opening part of this specification, in particular uncontrollable fluctuations in the pressure in the recycling means. Although U.S. Pat. No. 3,840,353 also discloses the option of providing a valve in the recycling means, that valve cannot eliminate or even only reduce the above-discussed difficulties but on the contrary makes the entire apparatus more complicated, and the apparatus then also becomes more susceptible to trouble.

German published specification (DE-AS) No. 1,017,314 discloses a process and an apparatus for producing combustible gases from solid fuels using a fluidised bed reactor, wherein the particles of solid material which are carried from the reactor with the gas are also recycled, more particularly together with one of the gasification agents. Problems due to blockages of the recycling conduit are inevitable in that arrangement. Added to that is the fact that the solid particles to be recycled which move in a state of being accelerated by the flowing gasification agent cause a considerable amount of wear in the conduit system.

Chem.-Ing.-Tech. 57 (1985) No. 5, page 455 ff draws a comparison between highly expanded circulating fluidised layers with different gas feeds, also referring to the fact that there is a pressure difference between the interior of the reactor on the one hand and the recycling means on the other hand; it is assumed in relation to that pressure difference that it depends on the height of the bed of solid material in the recycling means. That publication does not refer to the above-discussed problem of the difficulties involved in recycling the solid materials which have been separated off, back into the reactor.

SUMMARY OF THE INVENTION

An object of the present invention is to provide a process for the treatment of granular solid material in a fluidised bed, which does not suffer from major difficulties in regard to differing pressure levels in various parts of the equipment used.

Another object of the invention is to provide a process for the treatment of granular solid material in a fluidised bed, which affords controlled recycling of solid material to the reactor from a solid material separator at the outlet of the reactor, under varying operating conditions.

A further object of the invention is to provide a process for fluidised-bed treatment of solid material in granular form, which can be operated at normal pressure or at an increased pressure, in relation to a wide range of fluidised beds from low-expansion to high-expansion and even circulating types.

Still a further object of the invention is to provide apparatus for treatment of granular solid material in a fluidised bed procedure, which affords controlled conditions in respect of pressure in the system.

In accordance with the invention, these and other objects are achieved by a process, and apparatus therefor, in which the solid material is treated in a fluidised bed condition in a reactor under the effect of a gaseous agent under at least atmospheric pressure. At least a part of the solid material leaves the reactor with the gaseous agent and is at least partially separated off in a separator and returned to the reactor by way of a recycling means. The separated-off material collects within the recycling means in a bed which in turn is at least partially fluidised by a gaseous agent, while within the overall system including the reactor, separator and recycling means there is a pressure drop such that the pressure within the separator is lower than the pressure in the region of the reactor in which the recycled solid material passes back into the reactor. The pressure in the recycling means between the separator and the upper boundary of the bed in the recycling means is reduced by suction removal of gas to a pressure level which is at least substantially equal to or lower than the lowest pressure in the separator.

The above-defined operating procedure provides that substantially the same pressure obtains in the recycling means between the separator and the bed of solid material, so the solid material from the separator can move unimpededly in that region towards the opening at which the recycling means communicates with the reactor, that is to say generally downwardly, as in that region there is no upwardly directed gas flow impeding the movement of the solid particles, due to an operating pressure drop. In addition, in that region, even in the case of larger amounts of solid material to be recycled, as may occur in connection with a circulating fluidised bed, the density of the solid particles-gas suspension will be so low that the risk of the solid particles becoming clogged, forming a solid bed in the conduit, does not arise. In addition the amounts of gas which possibly flow from the separator towards the reactor promote transportion of the particles from the separator towards the bed of solid material which is formed in the lower region of the recycling means. On the other hand the suction removal step for the purposes of reducing the pressure involved has the result that a certain amount of gas passes in a controllable manner, namely in dependence on the reduced pressure generated by the gas removal step, from the reactor into the lower region of the recycling means which is normally also in the form of a pipe portion, and loosens up the solid bed therein approximately in such a way as to form a fluidised bed so that the solid material which accumulates in that lower region of the recycling means moves downwardly without difficulties and can be introduced into the reactor from the lower region of the recycling means. The danger of the solid material becoming clogged in the recycling means is at least substantially avoided in that way, especially as it is readily possible and also advantageous for the region of the recycling means in which the pressure is held at a level equal to or lower than the pressure in the separator to be brought as close as possible to the reactor so that accordingly the height of the solid bed in the recycling means can be kept so low that clogging of the solid material accumulating in the recycling means is avoided in all circumstances. On the other hand the solid bed which is formed in the lower region of the recycling means and the upper boundary of which is disposed approximately in the region in which the gas is sucked away should be of a length, in the direction of flow of the gas, which is sufficient to produce a flow resistance which on the one hand prevents an uncontrolled pressure equalisation effect in the recycling means, as between the pressure level in the separator and the pressure level in the reactor, while on the other hand, by virtue of the flow of gas out of the reactor which is caused by the suction removal step, it provides for the production of a controlled fluidised bed which is preferably little expanded in the lower region of the recycling means, thereby ensuring continuous and trouble-free recycling of the solid material from the lower region of the recycling means into the reactor.

In accordance with a preferred feature, the solid material which is separated off within the recycling means is firstly introduced into an equalising container and the solid bed which is formed therein is fluidised by gas which is introduced into the container in order thereby to carry the solid material from that container into the connecting conduit between the container and the fluidised bed reactor, in which conduit the solid material is fluidised by gases flowing out of the reactor; the region above the fluidised bed in the equalising container and in the connecting conduit is adjusted by gas suction removal to a pressure level which is equal to the lowest pressure in the separator or possibly even lower than that pressure. The gaseous agent which is introduced into the container may be supplied from the outside. As that agent passes into the reactor with the gas which has been sucked away, it may be desirable for the gaseous agent used to be a gasification agent or a mixture of gasification agents, possibly with inert gas. However it is also possible to use exclusively inert gas, in particular when the aim is to ensure that the solid material in the equalising container does not react therein with the gas which is supplied for fluidisation purposes.

Another alternative embodiment provides that the portion of the solid material which is separated off in the separator is passed with the gas that has been sucked away into a second separator disposed within the recycling means, the gas removal step being effected at the location provided for the discharge of gas from that second separator while the solid material which is separated off in the second separator is returned into the connecting conduit to the fluidised bed reactor. In that case the upper boundary of the solid bed which is to be found in the lower region of the recycling means and which is fluidised by the gases flowing from the reactor into the recycling means occurs within the second separator which is generally in the form of a cyclone separator.

Another preferred feature provides that the flow resistance in the suction conduit may be altered, with the result that it is also possible precisely to adjust the pressure difference required for producing the reduced pressure. That affords the option of controlling operation of the reactor. With suitable setting of the pressure difference, the entire amount of gas passing into the recycling conduit is sucked away. In the case of a combustion process for example the pressure at the gas removal location may be lower than the pressure obtaining in the lower part of the separator. In that case, the amount of flue gas which is sucked from the separator and blown back into the reactor is larger than that involved in normal operation. In that way it is possible to maintain a rest-condition fire in the reactor. Similar operating conditions may be set in relation to gasification processes. At any event it is possible to set up part-load conditions in regard to operation the reactor, by way of the suction removal pressure.

The gas suction removal step for the purposes of reducing the pressure in the recycling means is advantageously effected by means of an injector through which at least a portion of the gaseous agent or agents blown into the fluidised bed reactor is passed. That operating procedure gives the advantage that the reduction in pressure is achieved using simple means, as it is only necessary for at least one of the delivery conduits for the feed of the gaseous agent into the reactor to be provided with an injector, an injector representing an uncomplicated component that is less liable to trouble by virtue of its simplicity of design and the absence of moving parts. The latter aspect is particularly important for the reason that the gases which are sucked out of the recycling means by way of the injector may contain solid particles, even if only in a small amount, which can give rise to faults or at least cause an excessive amount of wear in a complicated installation for producing the reduced pressure, for example when using a fan or blower. On the other hand there is no fear of operating faults or failure caused by a significant amount of wear in the case of an injector, due largely to the above-mentioned absence of moving parts.

Besides the possibility of adjusting the reduced pressure which causes the suction removal of gas in the recycling means, by virtue of a variation in the flow resistance in the suction conduit, it is also possible to adjust the reduced pressure and therwith the mode of operation of the reactor by selectively cutting individual injectors in and out or by regulating the amount of propellant gas passing through the injector. The first-mentioned control mode is possible when, as is generally the usual practice, the agents required for the fluidisation procedure and for the reaction operations within the installation are blown into the reactor in a distributed configuration by way of a plurality of feed conduits and nozzles.

Further objects, features and advantages of the invention will become apparent in the following description of preferred embodiments.

DESCRIPTION OF PREFERRED EMBODIMENTS

Figure 1:
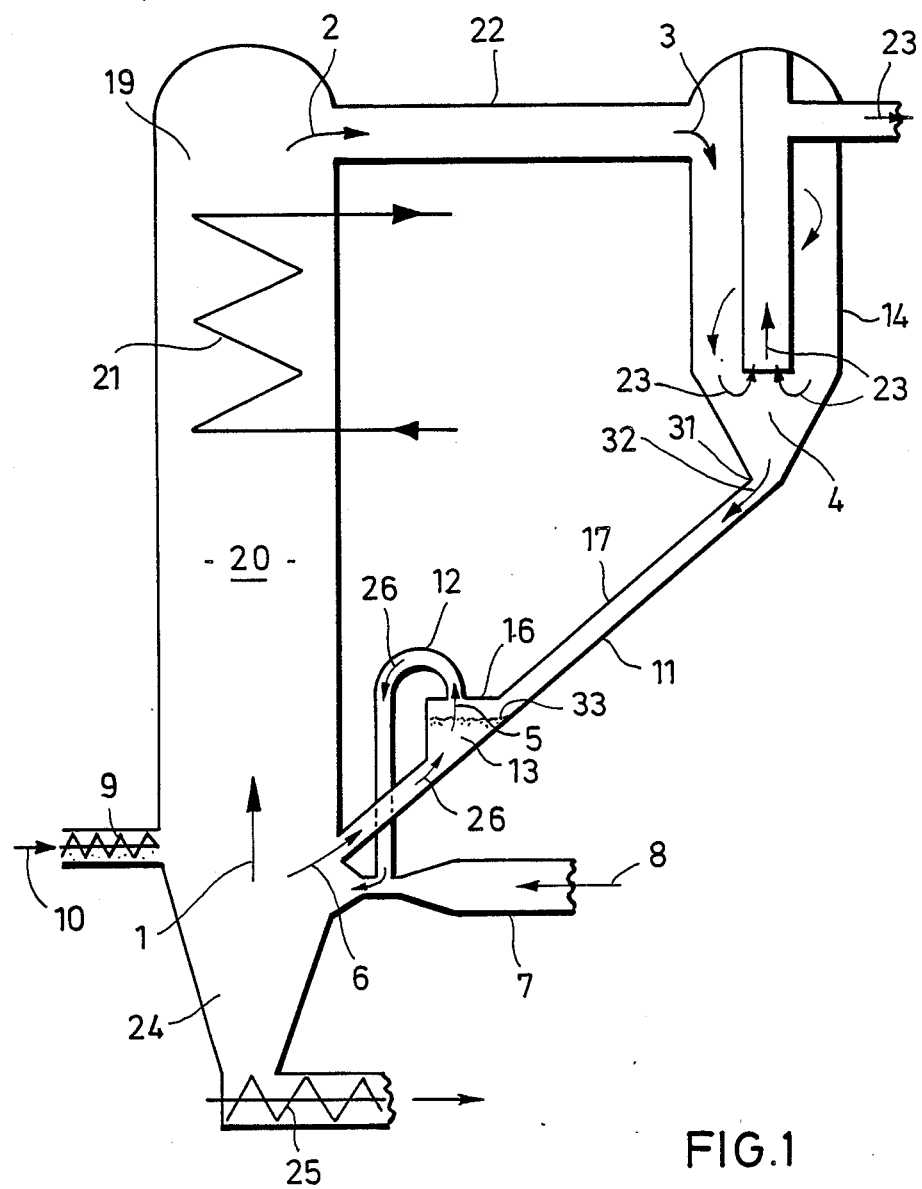
FIG. 1 is a diagrammatic view of an apparatus for the treatment of granular solid materials in a fluidised layer.

Referring firstly to FIG. 1, granular solid material as indicated at 10 is introduced into a fluidised bed reactor 20, for example by way of a conveyor screw 9, for conversion or reaction thereof under at least atmospheric pressure. Reaction of the solid material takes place at elevated temperature using one or more gaseous agents 8 blown into the reactor 20 by way of an injector 7. It will be appreciated that, although this is not illustrated in FIG. 1, the gaseous agent or agents 8 are normally blown into the reactor 20 by way of a multiplicity of nozzles which are arranged in a distributed configuration around the periphery of the reactor and possibly also at vertical spacings from each other. One or more of those nozzles may be in the form of an injector as indicated at 7.

Reaction of the solid material 10 takes place in a fluidised bed such as a highly expanded fluidised layer which extends substantially over the entire vertical length of the reactor 20, or in a circulating fluidised layer. A mixture of unreacted gas and gas produced in the reaction and solid particles is discharged from an upper portion 19 of the reactor 20 by way of a connecting conduit 22 into a separator, for example a cyclone separator 14, in which the solid particles are separated from the gases. The cleaned gases are passed out of the separator 14 by way of the conduit 23 into apparatuses which are disposed downstream thereof.

The solid particles which have been separated off in the separator 14 pass into the lower region thereof and from there into a recycling means which provides a communication between the separator 14 and the lower portion of the fluidised bed reactor 20, as will be described in greater detail below. It will be seen that the recycling means bridges over a substantially vertical distance between the separator and the reactor.

The solid reaction residue, being therefore for example solid gasification residue in the case of a process for the gasification of carbonaceous particles, drops into the lower region 24 of the reactor 20 and is discharged therefrom by way of a discharge member 25, for example a screw.

Figure 4:
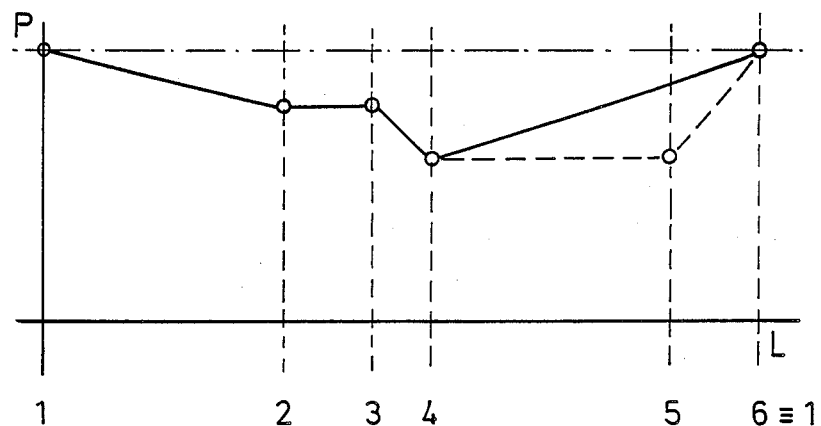
FIG. 4 is a view in the form of a graph of a possible pressure situation within the apparatus.

Referring now to the graph in FIG. 4 to discuss the pressure conditions involved in such an installation, different pressures P obtain along the distance indicated at L, that is to say along the path of movement of the solid particles within the entire installation, that is to say the reactor 20, the conduit 22, the separator 14 and the recycling means 11. Pressure 1 obtains in the lower region 24 of the reactor 20 while the pressure obtaining in the upper portion 19 of the reactor 20 and in the region of the beginning of the conduit 22 is pressure 2 which is slightly lower than the pressure 1 in the lower region 24 of the reactor. Pressure 3 which is substantially equal to the pressure 2 in the upper region 19 of the reactor 20 obtains in the region in which the gases, mixed with the entrained solid particles, pass into the cyclone separator 14. Within the cyclone separator 14 the gases and solid particles are carried downwardly, the gases and solid particles being separated from each other with a drop in pressure to the level 4 in the lower region of the separator 14. In the lower region of the separator 14, that is to say in the region at which the pressure is at the level indicated at 4, the solid particles pass into the recycling conduit 11 of the recycling means. In the latter, in a downward direction, the pressure increases to the level of the pressure 6, which is equal to the pressure 1 in the lower region of the reactor 20.

The above-described pressure conditions P which occur in known apparatuses correspond to the solid line indicated at 1 to 4 and 6 in FIG. 4, in regard to the basic pressure configuration, that is to say in regard to the variations in that pressure, although the pressure configuration as between the lower region of the separator 14, that is to say the pressure 4, and the mouth opening of the recycling conduit into the reactor 20, is shown in a very idealised form. In actual fact it is necessary to reckon on continuous fluctuations in pressure, caused by pressure surges or the like.

Returning now again to FIG. 1, disposed on the top side 17 of the recycling conduit 11 of the recycling means is a connecting portion 16 which communicates with the narrowest part of the injector 7 by way of a communicating conduit 12. As a result of the flow of the gaseous agent or agents 8 through the injector 7, due to the usual injector effect, the communicating conduit 12 has a pressure difference relative to the pressure in the recycling conduit 11. That pressure difference provides that gases 26 which are caused to flow into the mouth opening of the recycling conduit 11 at the end thereof towards the reactor and the gases 32 which are caused to flow into the intake end 31 of the recycling conduit 11 from the cyclone separator 14 and which represent a portion of the gases which passed into the separator 14 are sucked away at the connecting portion 16 and are returned into the reactor 20 by way of the injector 7. More specifically in that way the pressure in the recycling means between the separator 14 and the upper boundary of the bed of solid material which is formed in the recycling means is reduced by the suction removal of gas to a level which is equal to or even lower than the lowest pressure in the separator 14. Thus, in the region of the connecting portion 16, there occurs a pressure level as indicated at 5 in FIG. 4 which is at least approximately equal to the pressure level 4 in FIG. 4 at the lower outlet of the cyclone separator 14 and whose precise value is dependent on the action of the injector 7. The pressure level 6 in FIG. 4 obtains at the mouth opening of the recycling conduit 11 where it communicates with the reactor 20. The pressure configuration corresponds to the line 4-5-6 shown in broken form in the right-hand part of FIG. 4. In that case the change in pressure from the level 4 to the level 6, which is necessary along the recycling means in order for the solid particles to be transported back into the reactor 20, now takes place over the short distance between the connecting portion 16, which is at the pressure level 5, and the mouth opening of the recycling conduit 11 where it communicates with the reactor 20, where the pressure level is shown at 6. The bed of solid material which is formed in the region of that section and which is fluidised by the gases 26 levels off at the level indicated at 33 in the region of the connecting portion 16 in the recycling means. The level 33 remains substantially unaltered, irrespective of the amount of solid material flowing thereto from the separator 14. The return flow of the solid material into the reactor is not impeded. Uncontrolled pressure surges which often occur in known apparatuses, with the consequences thereof, referred to as 'slugging', do not occur.

For the purposes of removing the heat produced in the reactor 20 in the reaction of the solid material 10, heat exchange surfaces 21 are provided in the upper part 19 of the reactor. Steam for example is generated in the heat exchanger assembly which provides those heat exchange surfaces.

Figure 2:
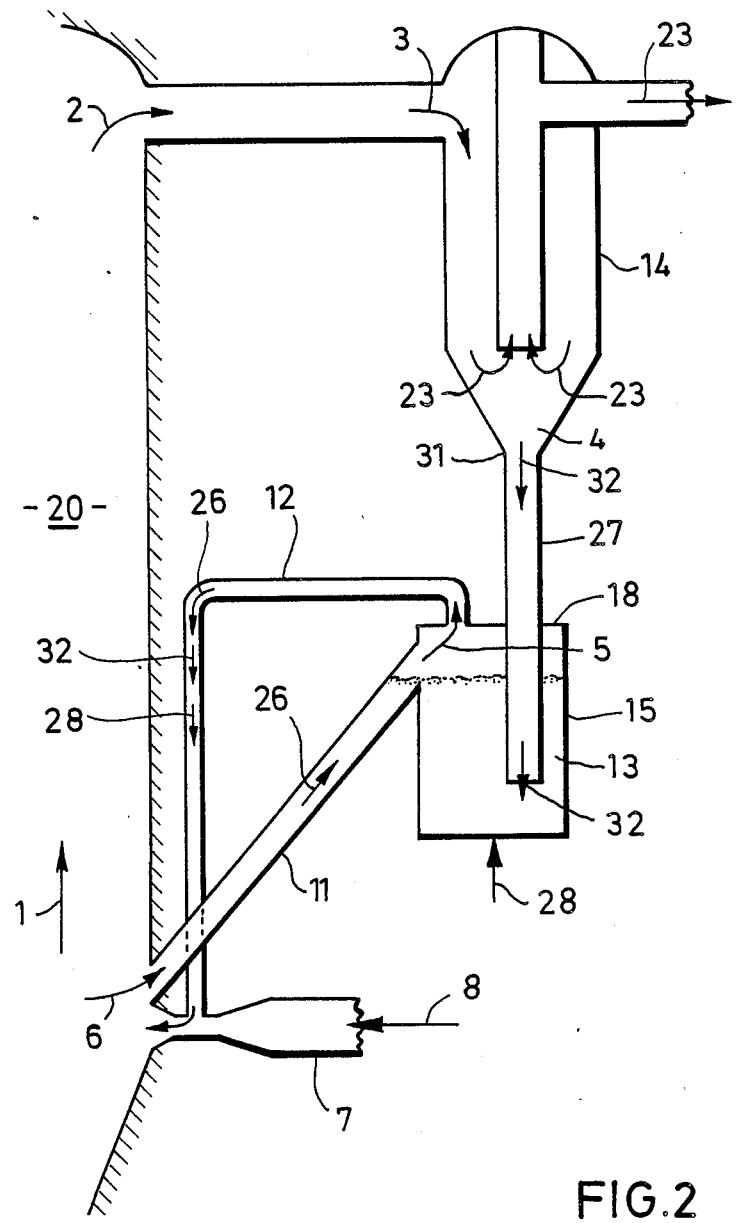
FIG. 2 shows a second embodiment of such an apparatus

Referring now to FIG. 2, in a modified embodiment of the apparatus in which the assembly of the reactor 20 is generally as described with reference to FIG. 1, the recycling means is provided with a compensating or equalising container 15 into which a gravity feed or down pipe 27 opens. The upper end of the pipe 27 is connected to the lower outlet 31 of the cyclone separator 14. Solid material 13 which is separated off in the separator 14 accumulates in the container 15 into which gas is introduced from below by way of a connection as indicated at 28 so that the solid material in the container 15 experiences a certain fluidisation effect.

In this embodiment, the recycling conduit 11 communicates the container 15 with the reactor 20. In the view shown in FIG. 2, the recycling conduit 11 starts from the upper region of the container 15 so that the fluidised solid material 13 in the container 15 can be transferred from the container 15 into the recycling conduit 11.

Provided at the top side of the container 15 is a conduit 12 which communicates the interior of the container 15 with the injector 7 so that the gases 26 flowing from the reactor 20 into the recycling conduit 11 are sucked away by way of the recycling conduit 11 and the container 15 and are returned into the injector 7. That causes a pressure level as at 5 in FIG. 4 to occur in the upper part of the container 15. The gases 26, 32 and 28 which are sucked away by way of the communicating conduit 12 are returned to the reactor 20 through the injector 7, together with the gaseous agent 8.

This embodiment having the container 15 therefore also involves a pressure level 5 generally corresponding to the view shown in FIG. 4, with the difference in relation to the pressure configuration specifically shown in FIG. 4 that essentially lies in the distance between points 4 and 5 on the abscissa, which shows the length L of the distance between the region at the pressure level 1 and the region at the pressure level 6. In comparison with the apparatus shown in FIG. 1, the apparatus shown in FIG. 2 involves the pressure level 5 occurring at a shorter distance after the pressure level 4.

Figure 3:
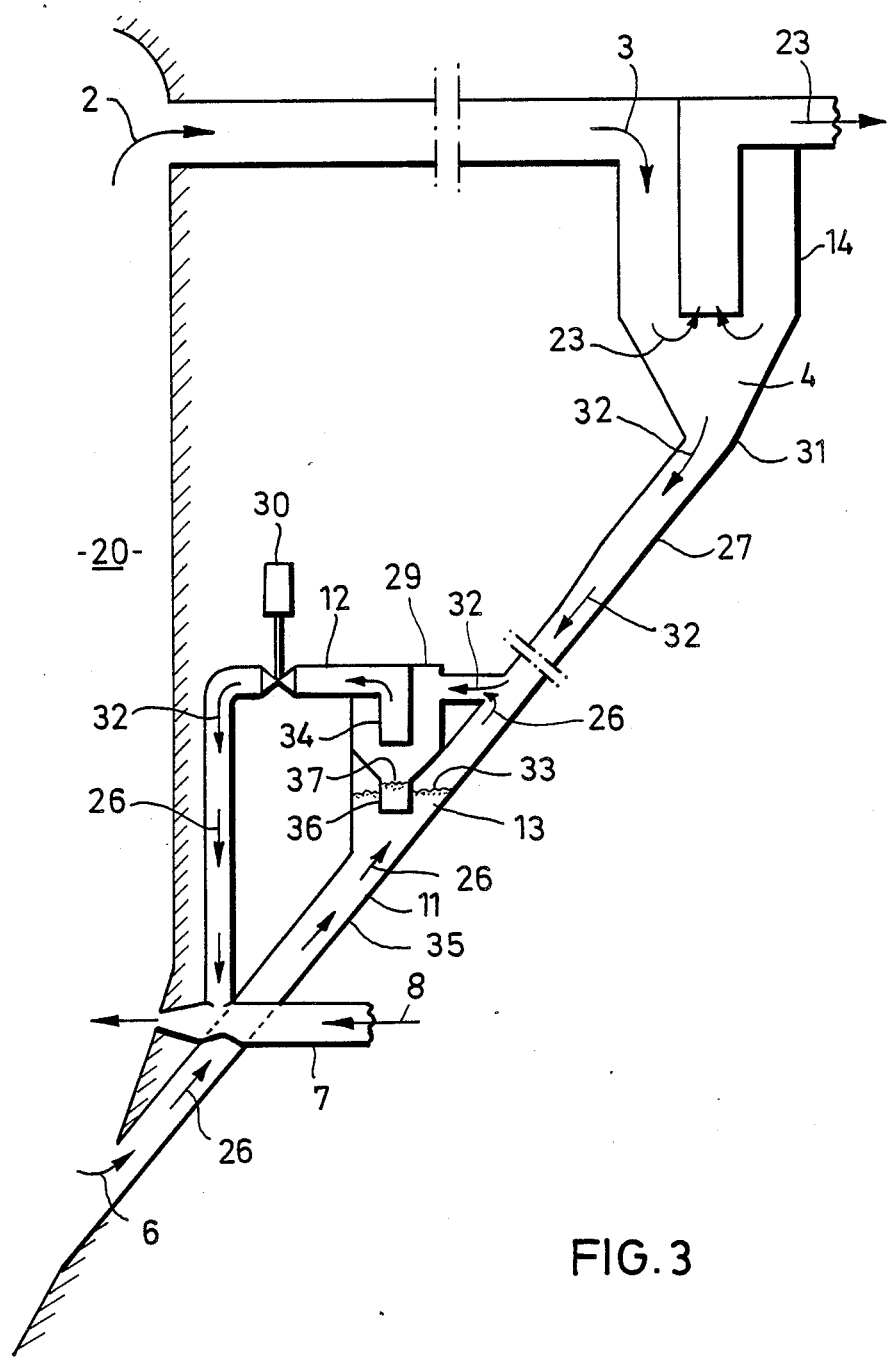
FIG. 3 shows a third embodiment of such an apparatus.

In a further modified form of the apparatus illustrated in FIG. 3, arranged in the lower part 35 of the recycling means, more specifically the conduit 11, is a second separator 29 having an immersion pipe 34 connected to the injector 7 by way of conduit 12. The solid material 13 levels off within the separator 29 at the level indicated at 33 and at the level indicated at 37 within the discharge hopper portion 36. The suction pressure in the conduit 12 and thus in the second separator 29 can be adjusted with a high degree of accuracy by way of an adjusting member 30, for example an adjustable throttle means.

Under the effect of the suction pressure produced by the injector 7, the gases 26 which flow upwardly in the recycling conduit 11 from the reactor 20 and the gases 32 which issue from the first separator 14 downwardly towards the second separator 29 together with the solid material 13 which has been separated off pass into the pipe 34 from which they are sucked away into the conduit 12. As in the two embodiments described above with reference to FIGS. 1 and 2, the gases which are sucked away by the injector 7 are passed back into the reactor 20.

Different amounts of gases 26 and 32 are sucked out of the recycling conduit 11 in dependence on the setting of the throttle member 30 and thus the reduced pressure which is operative in the conduit 12, the level 33 of the bed 13 of solid material altering only to an immaterial degree, with differing suction pressures, while the amount of gases 26 and 32 which are sucked away is an indicator in regard to the operating condition of the reactor. When the reactor is used for the combustion of solid material, for example in the part-load range, a larger amount 32 of the flue gases 23 produced is sucked away, in comparison with which the amount of combustion gases 26 which is sucked out of the reactor 20 is lower.

The arrangement of a second cyclone separator 29 in the recycling means is particularly suitable for sucking the gas away with a low dust content therein, with simultaneously easier control of the operating condition. A further improvement in the recycling of separated-off solid material 13 can be achieved by the cross-section of the lower part 35 of the recycling conduit 11 being increased, without thereby altering the level of the bed of solid material 13 which has been separated off.

The pressure level P shown on the ordinate axis in FIG. 4 reproduces the actual conditions, only in regard to the direction of the respective variations in pressure, for the pressure differences which can actually be measured are generally slight and may be of the order of magnitude of between 0.1 and 1 bar.

The above-described process and apparatus can thus provide that controlled recycling of the solid material from the separator into the reactor can be effected in varying operating conditions using simple means in a reliable and trouble-free manner, more particularly both in regard to processes which are operated at normal pressure and also processes which are operated at an increased pressure, and in relation to low-expansion to high-expansion and possibly circulating fluidised layers.

It will be appreciated that the above-described process and apparatus have been described solely by way of example of the invention and that various modifications and alterations may be made therein.

What is claimed is:

1. A process for the treatment of granular solid material in an apparatus including: a fluidized bed reactor having an upper portion and a lower portion, a means for introducing a granular solid material into said reactor and a means for introducing at least one gas from a location outside of said reactor to a location inside of said reactor, a separator means for separating off particles of solid material from a gas-solids mixture exiting from said reactor, said separator means having a particulate collection portion and a gas collection portion, a connecting means for connecting said reactor upper portion with said separator means, a recycling means comprising a first conduit having an upstream end and a downstream end, a second conduit having an upstream end and a downstream end, and a particulate collection zone, wherein said first conduit upstream end is in open communication with said separator means particulate collection portion, and said first conduit downstream end is in open communication with said recycling means particulate collection zone, and wherein said second conduit upstream end is in open communication with said recycling means particulate collection zone, and said second conduit downstream end is in open communication with said reactor lower portion, a reduced pressure source having a downstream end in open communication with said reactor, and a suction conduit having an upstream end in open communication with said recycling means particulate collection zone, and a downstream end in open communication with said reduced pressure source, said process comprising:

(a) introducing granular solid material into said reactor through said granular solid material introducing means, (b) treating said granular solid material with at least one gas, under at least atmospheric pressure, in a fluidized layer, wherein at least a portion of said granular solid material leaves said reactor with said at least one gas, (c) separating off at least a portion of said at least one gas from said granular solid material in said separator means, (d) returning said separated-off granular solid material to said reactor, by way of said recycling means, wherein said separated-off granular solid material collects within said recycling means particulate collection zone resulting in the formation of an auxiliary bed of granular solid material in said second conduit's upstream end which is at least partially fluidized under the effect of gases flowing upwardly from said reactor lower portion into said recycling means through said second conduit downstream end, and wherein within said apparatus, which includes said reactor, said separator means and said recycling means, there is a pressure drop such that the pressure within said separator means is lower than the pressure in said reactor lower portion in which said separated off and recycled granular solid material passes back into said reactor, and (e) suctionally removing gases, which flow upwardly from said reactor lower portion into said recycling means second conduit, and which flow downwardly from said separator particulate collection portion into said first conduit, from said recycle means particulate collection zone, through a common exhaust, by creating a pressure level which, at its maximum, is substantially equal to the lowest pressure in said separator means.

2. A process as set forth in claim 1 wherein said pressure in said recycling means particulate collection zone is lower than said lowest pressure in said separator means.

3. A process as set forth in claim 1 wherein said particulate collection zone comprises an equalizing container and wherein said separated-off granular solid material leaving said separator means from said particulate collection portion is introduced into said equalizing container, wherein a bed of granular solid material, formed in said equalizing container, is fluidized by at least one gas introduced into said equalizing container in order to transfer at least a portion of said granular solid material from said equalizing container into said second conduit upstream end, wherein said granular solid material in said second conduit is at least partially fluidized by gases flowing out of said reactor, and wherein the region above said fluidized bed in said equalizing container, and above said fluidized bed in said second conduit, is adjusted by suctionally removing gases therefrom to result in a pressure level which is, at its maximum, substantially equal to the lowest pressure in said separator means.

4. A process as set forth in claim 3 wherein said pressure level in said region above said fluidized bed in said equalizing container, and above said fluidized bed in said second conduit, is lower than the lowest pressure in said separator means.

5. A process as set forth in claim 3 wherein said at least one gas introduced into said equalizing container is supplied from a location outside said apparatus through an injector means.

6. A process as set forth in claim 5 wherein said at least one gas supplied to said equalizing container participates in the reaction of said granular solid material in said reactor.

7. A process as set forth in claim 1 wherein said granular solid material, which is separated off in said first-mentioned separator means, is passed into a second separator disposed within said recycling means, wherein said suction removal of gas is effected at the location for the discharge of gas from said second separator, and wherein said granular solid material, which is separated off in said second separator, is passed into said second conduit upstream end.

8. A process as set forth in claim 1 wherein said gas which is sucked out of said recycling means is blown into said reactor.

9. A process as set forth in claim 1 wherein the step of suctionally removing gas, for the purpose of reducing the pressure in said recycling means, is effected by an injector through which at least a portion of said at least one gas, introduced into said reactor, is passed.

10. Apparatus for the treatment of granular solid material in a fluidized bed comprising:

(a) a fluidized bed reactor having an upper portion and a lower portion, a means for introducing a granular solid material into said reactor and a means for introducing at least one gas from a location outside of said reactor to a location inside of said reactor at a position to form a fluidized bed of said solid material therein, (b) a separator means for separating off particles of granular solid material from a gas-solids mixture exiting from said reactor, said separator means having a particulate collection portion and a gas collection portion, (c) a connecting means for connecting said reactor with said separator means, (d) a recycling means comprising a first conduit having an upstream end and a downstream end, a second conduit having an upstream end and a downstream end, and a particulate collection zone, said first conduit upstream end being in open communication with said separator means particulate collection portion, and said first conduit downstream end being in open communication with said recycling means particulate collection zone, and wherein said second conduit upstream end being in open communication with said recycling means particulate collection zone, and said second conduit downstream end being in open communication with said reactor lower portion, (e) a reduced pressure source having a downstream end in open communication with said reactor, and, (f) a suction conduit having an upstream end in open communication with said recycling means particulate collection zone, and a downstream end in open communication with said reduced pressure source wherein gases flow upwardly from said reactor lower portion into said recycling means through said second conduit downstream end such that granular material collected within said recycling means particulate collection zone is fluidized.

11. Apparatus as set forth in claim 10 wherein said reduced pressure source comprises an injector means for injecting at least a portion of said at least one gas into said reactor.

12. Apparatus as set forth in claim 10 wherein said recycling means particulate collection zone comprises an equalizing container, said first conduit connecting said equalizing container to said separator, said second conduit connecting said equalizing container to said reactor lower portion, a feed conduit means, in open communication with said equalizing container, for introducing at least one gas into said equalizing container to fluidize a bed of said granular solid material therein and to transfer at least a portion of said granular solid material from said equalizing container into said second conduit upstream end, wherein, when in operation, said granular solid material is at least partially fluidized in said second conduit by gases flowing into said second conduit from said reactor, and said suction conduit communicating the region above said fluidized bed of solid material in said equalizing container, and above said fluidized bed of solid material in said second conduit, with said reduced pressure source.

13. An apparatus as set forth in claim 10 wherein said recycling means particulate collection zone comprises a second separator having a particulate collection portion and a gas collection portion, said first conduit connecting said second separator to said first-mentioned separator particulate collection portion, said second conduit connecting said second separator particulate collection portion to said reactor lower portion, and said second separator comprising a dip pipe having an upstream end terminating within said second separator gas collection portion and a downstream end in open communication with said suction conduit upstream end.

14. Apparatus as set forth in claim 10 wherein an adjustable throttle means is operatively located between said suction conduit upstream end and said suction conduit downstream end for controlling the pressure differential within said recycling means.

* * * * *